(12) United States Patent
Sheets (10) Patent No.: US 6,869,539 B2
(45) Date of Patent: Mar. 22, 2005

(54) RECLAMATION OF MATERIALS IN A CLOSED ENVIRONMENT WITH REMEDIAL WATER

(76) Inventor: Richard G. Sheets, 7865 NE Day Rd. West, Bainbridge Island, WA (US) 98110

( * ) Notice: Subject to any disclaimer, the term of this patent is extended or adjusted under 35 U.S.C. 154(b) by 0 days.

(21) Appl. No.: 09/989,192

(22) Filed: Nov. 21, 2001

(65) Prior Publication Data

US 2002/0113017 A1 Aug. 22, 2002

Related U.S. Application Data

(63) Continuation of application No. PCT/US00/09809, filed on May 17, 2000.
(60) Provisional application No. 60/135,666, filed on May 24, 1999.

(51) Int. Cl.$^7$ ............................................... C02F 11/14
(52) U.S. Cl. ..................... 210/747; 210/749; 210/754; 210/759; 210/760; 210/772
(58) Field of Search ............................... 210/747, 749, 210/754, 759, 760, 768, 772; 134/25.1, 40, 42

(56) References Cited

U.S. PATENT DOCUMENTS

| | | | |
|---|---|---|---|
| 4,735,725 A | 4/1988 | Reischl et al. ............... 210/616 |
| 4,849,360 A | * 7/1989 | Norris et al. ................ 435/264 |
| 5,051,161 A | 9/1991 | Yamaguchi et al. ......... 204/229 |
| 5,252,138 A | * 10/1993 | Guymon ....................... 134/42 |
| 5,656,239 A | 8/1997 | Stegemeier et al. ........... 422/32 |
| 5,885,203 A | 3/1999 | Pelletier ...................... 588/249 |

\* cited by examiner

*Primary Examiner*—Ivars C. Cintins
(74) *Attorney, Agent, or Firm*—Heller Ehrman White and McAuliffe LLP (57) ABSTRACT

Cost-effective processes and tools used therein are described that decontaminate sludge using remedial water in a closed and environmentally friendly system. Typical contaminants such as toxic metals, microorganisms, and toxic compounds are detoxified or destroyed by one or more remedial water treatments to sludge that is confined to the closed system. The closed system may comprise a covered rail road car, ISO container, or other large space into which the remedial water, and optionally, remedial gas, is applied by injection or other means. In a preferred embodiment, water is electrochemically activated at the site of use and injected through an array of pipes within the container. A large variety of other waters and combinations of water, and even air treatments are particularly useful in combination with the closed system for treating sludge. Sludges such as dredged material, human or animal waste, and soils or sediments, are particularly amenable to conversion by the materials and methods of the invention into a more beneficial end use product.

33 Claims, 2 Drawing Sheets

FIG. 1

RECLAMATION OF MATERIALS IN A CLOSED ENVIRONMENT WITH REMEDIAL WATER

This application is a continuation of PCT/US00/09809 filed on May 17, 2000, which claims priority from U.S. Provisional Application No. 60/135,666 filed May 24, 1999, which is hereby incorporated by reference.

FIELD OF THE INVENTION

The invention relates generally to the remediation of materials such as dredged sediment by removal of toxic molecules (including volatile organics), microorganisms and/or heavy metals via treatment with remedial water in a closed space, and particularly relates to new uses of electrochemically activated water for large scale environmental remediation.

BACKGROUND OF THE INVENTION

Substantial areas of land and of submerged land in the world have become contaminated from industrial, waste disposal, farming, logging, military, mining and other activities. The U.S. Environmental Protection Agency ("EPA") has estimated that 10 percent of the nation's lakes, rivers, and bays are sufficiently contaminated with toxic pollutants to pose potential risks to fish and to humans and wildlife who eat fish. "EPA's Contaminated Sediment Management Strategy," EPA-823-R-98-001, 1998. According to the EPA, 15 percent of the nation's lake acreage and 5 percent of the nation's river miles are under state-issued fish consumption advisories, including parts of each of the great lakes and a large portion of the nation's coastal waters. See, for example, "Listing of Fish and Wildlife Consumption Advisories", EPA 823-C-97-004, 1997, "The Incidence and Severity of Sediment Contamination in Surface Water of the United States", EPA 823-R-97-006, 007, 008, 1998, and "Fact Sheet of April 1998," EPA-823-F-98-004. Thus, billions of dollars of economic activity are affected by contaminated sediment, including the loss of recreational and commercial fishing grounds and a higher cost of disposing contaminated material that has been dredged to aid navigation.

The wide-spread contamination problem encompasses a diverse range of pollutants, including, for example, chemical compounds (e.g., dioxins, PCBs, pesticides and phenols, many of which are volatile), heavy metals (e.g., lead and mercury), and microbes (e.g., hepatitis, $E.\ Coli$, cholera). When on land, the contaminants threaten ground water, thus limiting drinking water supplies and even preventing land re-use. The contaminants also enter and threaten the marine environment, and often are found in sediments of coastal waters.

The United States, the European Community, and other countries have responded to this problem with legislation that pins liability on waste producers, other companies, and even innocent buyers of land that must clean up contamination after its discovery. In many cases the materials are wet and generally are termed "sludges." For purposes of this disclosure, the term "sludge" means contaminated wet materials such as sediment and also contaminated land, and other contaminated material byproducts from mining, farming (for example, feed lot waste and biomass production and waste) and other activities that generate toxic wet or wet-able mass requiring remediation.

A business, individual or government body having liability for a contaminated sludge is faced with an expensive and often technically complicated task. First, the presence of contaminants in sediment, for example, may prevent normal dredging and disposal of the sediment. Second, physical remediation of the sediment sludge must be carried out in a manner that does not pollute the environment. Third, the material must be disposed of in an environmentally safe manner and, preferably, one that has a societally beneficial use. In fact, whether the activity takes place on land or below the water surface, U.S. regulators charged with environmental policymaking increasing require the party charged with the clean-up to identify a productive, beneficial end use of the contaminated material prior to moving it. In other words, the overall problem flows from the three separate issues of (1) moving, (2) remediating, and (3) disposing of sludge without polluting the environment at each step. The problem is magnified by the immense volumes of contaminated sludges. Cost-effective technology is needed to manage these sludges—and particularly to manage the three areas simultaneously.

Technological solutions have been proposed that address one or more parts of this problem, but are too expensive or yield incomplete results. Numerous procedures are known for moving contaminated sludge, but transported material has to be processed and, in some cases, shielded from exposure to the environment to prevent further contamination of the environment, particularly when volatile contaminants are present. Thus, decontamination technology should take into account transportation, end-use, and cost savings for each of these areas.

Decontamination technology exists for handling sludges, including, for example, ex situ biological treatment (i.e., composting and landfarming), ex situ physical/chemical treatment (i.e., soil solidification, soil stabilization and solvent extraction) and other treatments, such as volatilization, soil washing, pump and treat systems, slurry phase bioremediation etc. Because of the special difficulty in removing organic materials, ex situ thermal treatment (i.e., high temperature thermal desorption, hot gas decontamination, incineration, low temperature thermal desorption, rotary kiln) or biological conversion as described in U.S. Pat. Nos. 4,750,436, 4,079,003, 5,172,709, 5,855,666 may be used to eliminate such contaminants. In each case, however, the procedure and materials for removing a given contaminant is not integrated sufficiently with the removal of other contaminants and with a low cost method that leaves the sludge in a ready to transport form.

The non-comprehensive approaches to remediation exemplified above are not sufficiently low cost or incorporated into a system that isolates contaminants from the environment during processing with conversion into a less-toxic form for transportation to a site for beneficial end use. Transfer of material to a toxic landfill, for example, or its entrapment within a matrix possessing a long (but limited) life is not a permanent solution. Such measures actually may incur future liability as the legal system evolves to address the long-term problem. Further, many, if not most of these processing techniques do not treat a wide range of contaminants. For example, most present biological processes such as composting and air-sparging do not alleviate the problem of toxic metals in the contaminated sludge. Furthermore, some techniques such as soil stabilization, incineration, and pump/treatment generate a large volume of secondary waste that is difficult to control. These procedures are high cost and fairly inflexible with respect to proximity to a particular site.

In sum, the problem of sludge remediation is multifactorial and raises processing concerns such as environmental contamination during remediation processing and movement, low cost transport of material and disposal of remediated material after conversion into an enhanced use form. A more comprehensive method that address all such factors in a low cost manner is needed.

SUMMARY OF THE INVENTION

It is an object of the invention to provide a method that remediates sludges in a closed environment at a lower cost. It is another object to provide tools and methods for lower cost remediation of sludges.

In one embodiment the invention provides a method for decontaminating sludge in situ, comprising the steps: (a) providing an array of injector pipes that can be fluidically connected to a source of remedial water; (b) inserting the array of injectors into the sludge; and (c) moving remedial water from the source of remedial water through the injectors into the sludge.

In another embodiment, the invention provides a device for decontaminating wet material in situ, comprising: (a) an array of injector pipes, each injector pipe being fluidically connected to a source of remedial water; (b) a source of remedial water, the remedial water comprising one or more active species selected from the list consisting of activated chlorine, activated oxygen and free radical; and (c) a pump for directly or indirectly moving the remedial water into the wet material.

In yet another embodiment, the invention provides a closed container for decontaminating sludge material via injection and removal of remedial water from material in the container, the container comprising: (a) a box that holds sludge material; (b) a water impermeable liner lining the interior of the box; (c) a removable two dimensional array of injector pipes that are vertically inserted into the box to inject the remedial water; and (d) a fixed array of drain pipes horizontally positioned at the bottom of the box; wherein the horizontal drain pipes partially dewater the sludge material and the injector pipes inject the sludge material with remedial water.

In yet another embodiment, the invention provides a method of eliminating an aromatic compound in a sludge, the aromatic compound having at least one electron donating aromatic group, comprising: (a) providing electrochemically activated water having a free radical selected from the group consisting of carbonate radical and bicarbonate radical; and (b) injecting the water from step (a) into the sludge.

In yet another embodiment, the invention provides a method of dehydrating clay, comprising: (a) providing electrochemically activated anodic water prepared from a salt solution having at least 10 mM concentration of a halide salt; and (b) contacting the water from step (a) with the clay.

In yet another embodiment, the invention provides a method of releasing a polyaromatic molecule from a sludge for a chemical reaction, comprising: (a) providing electrochemically activated water that has an imbalance of ionic charge and; (b) injecting the water from step (a) into the sludge.

In yet another embodiment, the invention provides a method of destroying an aromatic compound in a sludge, comprising: (a) providing electrochemically activated water that contains at least 250 mg/l of an ion selected from the group consisting of carbonate ion and bicarbonate ion, and wherein at least some of the ion is a free radical; and (b) contacting the water from step (a) with the sludge.

DETAILED DESCRIPTION OF THE INVENTION

The inventor extensively has studied alternative methods for sludge remediation and discovered methods and tools for low cost remediation of sludge that furthermore, allows for processing and transport of the treated material in an environmentally friendly manner. The inventor investigated the use of remediation water by mixing and by injecting the water into sludge and discovered that (1) certain types of prepared water were surprisingly useful for remediation and (2) injection of remediation water into sludge, in situ or in a large box provides lower cost processing and treatment of such materials in a more environmentally safe manner.

In embodiments of the invention, a sludge, such as a sediment in situ or material ex situ within a confined three dimensional volume or "closed environment" is treated with remedial water. Remedial water is added to this closed environment, preferably by injection through pipes that are inserted into the volume. After addition of the remedial water, the sludge, particularly if a sediment, may be sampled to determine the contamination status. The sludge may be further processed by one or more partial de-watering, remedial water injection or even remedial air injection steps as suited for the particular sludge.

The term "closed environment," as used in the context of the invention, means that the sludge does not move out of the volume (if in situ) or its container appreciably during its remediation. That is, during injection and reaction with remedial water, sludge within a sediment may mix with the remedial water and diffuse somewhat at the edges of the volume, but such diffusion is minimal. In the case of sediment sludge, less than 20% of the treated sludge in the treated volume, preferably less than 10% more preferably less than 5%, yet more preferably less than 2%, and most preferably less than 1% of the sludge will leave this defined space under water during the remediation process. In the case where the sludge is treated within a separate container such as a box or bag, less than 1% and preferably no detectable solid material leaves the box. In preferred embodiments boxed sludge is covered with a geomembrane and/or with a geotextile liner material, to prevent, or minimize contamination of the surrounding air with volatile organics or other gases such as hydrogen sulfide or methane from the sludge.

Two features of the invention, (1) remediation of sludge within a closed environment, and (2) removal of toxin (e.g. organic compound or undesirable form of heavy metal) by injection of remedial water, minimize contamination of the environment by sludge toxins, and provide lower cost treatment and transport options. In preferred embodiments, the sludge is dewatered, that is between 5% and 80%, and more preferably between 10% and 50% of the water is removed. Most preferably in this context, the sludge is placed into a box having a geotextile liner, and part of the liner, or another plastic is placed over the top of the sludge and a vacuum may be applied. After dewatering, remedial water is added, followed by another optional dewatering step. The steps of adding remedial water and dewatering may be repeated with different remedial water having alternative advantageous properties as described below.

Many different types of remedial water are contemplated by the inventor. One preferred water is water that has become electrochemically activated and which contains active chemical species caused by a voltage gradient across electrodes that the water has contacted. In one favored embodiment, cathodic water is prepared having a pH above 8, advantageously above 9, and more advantageous above 10, and containing one or more active species for chemical remediation, such as ozone, hydrogen peroxide, active chlorine, active bromine, or a radical formed directly or indirectly from hydroxyl radical. The inventor also discovered useful methods of making remedial water at the site of use, which provide lower cost remediation options. Examples of preferred remedial water and methods of their generation are provided below under the heading "Remedial Water."

The inventor has discovered a variety of techniques that physically combine remedial water with sludge in a closed environment to provide a higher value product that can be transported more simply and at an overall lower cost. One technique is treatment of sludge in situ. This technique increasingly will become very useful in the future as the cost of remedial water such as ECA water drops with technological advances, and is described below. In other preferred embodiments, sludge is placed into a multipurpose container such as an ISO container, rail car or other box having a liner and a drain(s) for dewatering. In each embodiment, environmental contamination is minimized and, in the latter embodiments, remediated sludge may even be transported within the same container to a site for end use.

Definitions of Terms Used

The following definitions are provided to assist the reader in understanding how to make and use the invention and to understand the scope of the claims.

"Activated Solution" means an aqueous solution that can alter one or more chemical properties of another liquid, solid, or chemical that it contacts, and may include, for example, a non-organic salt, a sulfate, a chloride or a carbonate.

"Dewater" means to remove at least some water from sludge.

"Dredging" means the removal of sludge from the bottom of a water body such as for example, a river, harbor, coastal region, pond, or pool formed from an earthen embankment.

"Electrochemically Activated Water" ("ECA" water) means water (1) that contains one or more species of atoms or molecules that has become activated and capable of undergoing a chemical reaction with sludge, by the use of electric power. Typically, ECA water is prepared by passing electric current between at least two electrodes, preferably separated by a membrane(s). Anodic ECA water means water that has been preferentially removed from the vicinity of an anode after activation. Cathodic water means water that has been preferentially removed from the vicinity of a cathode after activation. In many cases, salt such as sodium bromide, sodium chloride, potassium bromide, potassium chloride has been added to the water before activation to produce reactive species of halide ion.

Geomembrane: an essentially impermeable geosynthetic composed of one or more synthetic sheets.

Geosynthetic: A planar product manufactured from polymeric material used with soil, rock, earth, or other geotechnical engineering related material as an integral part of a man-made project, structure, or system.

"Heavy Metal" means a metallic element with a high atomic weight such as mercury, chromium, cadmium, arsenic and lead.

"Impermeable" means a non-porous substance having hydraulic connectivity of $1 \times 10^{-7}$ or less.

"In situ" means in its naturally found state, typically underwater. A contaminated sediment in a lake bottom or a lagoon is present in situ, even though the lagoon sediment may have been created by pumping sludge into a treatment pond and initially treated by another procedure to partly remediate the material.

"Leachate" means a liquid that comes from sludge and may be, for example, exudate, filtrate or a decant from a sludge material.

"Liner" means a barrier designed to limit or prevent passage of leachate. For example, a liner may be a geomembrane or geosynthetic material covering the inside of an ISO container or rail box.

"Material" is a non-gaseous mixture of at least two substances such as one or more chemical reagents (solutes or insolubles) in a solvent or two or more substances in a solid mixture. A material may exist as a suspension, slurry, dry powder or wet mixture comprising various types of molecules. Many embodiments discussed herein describe treating a "sludge" material having one or more suspected or known undesirable toxins (molecular, microbial or elemental) to remove at least some of the toxin (by for example, leaching) or to transform at least some of the toxin to another form (by chemically altering its covalent structure or complexation with other elements/compounds). However, other, non-sludge materials are contemplated in some embodiments, including for example, materials used for organic syntheses and feedstocks that are to be converted into other forms for specific purposes. Embodiments that create and or use ECA water, optionally with an additive such as carbonate, bicarbonate, or halide salt are useful for transforming other materials to prepare useful product by chemical reaction(s) with such water.

"On site" means at the location where a sludge is created or naturally found. For sediment sludges that exist under water, on site also means the site where the sediment is found "in situ" or a nearby shore facility that accepts dredges and where a dredge receiving station can be set up to treat the sediment by an enclosed conveyer belt or a regular enclosed container "ex situ."

"ORP" means oxidation reduction potential. This value is determined by comparison to a reference electrode and indicates the ability of a chemical species to give up an electron or acquire an electron. Standard systems for measuring ORP of ECA water are known and generally indicate an ORP of greater than 1000 mV for anodic solutions and an ORP that is negative by at least about 750 mV.

"Residency Time" means the duration of exposure of sludge in a container to remedial water.

"Sacrificial electrode" means an electrically conductive material used to generate ECA water that is less stable than platinum and has a surface that decomposes during use. Generally, a sacrificial electrode comprises a metal or semiconductor such as titanium dioxide that is relatively inexpensive, and is designed to be replaced on a regular use basis.

"Sediment" means a soil, sand, mineral or organic material deposit at the bottom of a body of water such as a harbor, river, port, coastal region, pond, or pool created by an earthen embankment.

"Semi-Volatile Organic Compounds" means a compound that comprises carbon atoms covalently bound to other atoms and that has enough volatility to be detected in air that is in contact with sludge that contains the compound. Examples of semi-volatile organic compounds include: (1) Bis(2-chloroethoxy) ether; 1,2-Bis(2-chloroethoxy) ethane; Bis(2-chloroethoxy) methane; Bis(2-chloroethoxy) phthalate; Bis(2-chloroethyl) ether; Bis(2-chloroisopropyl) ether; 4-Bromophenyl phenyl ether; 4-Chloroaniline; 2-Chloronaphthalene; 4-Chlorophenyl phenylether; 2-Chlorophenol; 1,2-Dichlorobenzene; 1,3-Dichlorobenzene; 1,4-Dichlorobenzene; 3,3-Dichlorobenzidine; 2,4-Dichlorophenol; Hexachlorobenzene; Hexachlorobutadiene; Hexachlorocyclopentadiene; Pentachlorophenol (PCP); p-Chloro-m-cresol; Polychlorinated biphenyls (PCBs); Tetrachlorophenol; 1,2,4-Trichlorobenzene; 2,4,5-Trichlorophenol; 2,4,6-Trichlorophenol. (2) Benzidine; Benzoic Acid; Benzyl alcohol; Bis(2-ethylhexyl)phthalate; Butyl benzyl phthalate; Dibenzofaran; Di-n-butyl phthalate; Di-n-octyl phthalate; Diethyl phthalate; Dimethyl phthalate; 4,6-Dinitro-2-methylphenol; 2,4,-Dinitrophenol; 1,2-Diphenylhydrazine; Isophorone; 2-Nitroaniline; 3-Nitroaniline; 4-Nitroaniline; 2-Nitrophenol; 4-Nitrophenol; n-Nitrosodimethylamine; n-Nitrosodiphenylamine; n-Nitrosodi-n-propylamine; Phenyl naphthalene. Sites where semi-volatile organic compounds may be found include burn pits, chemical manufacturing plants and disposal areas, contaminated marine sediments, disposal wells and leach fields, electroplating/metal finishing shops, firefighting training areas, hangars/aircraft maintenance areas, landfills and burial pits, leaking collection and system sanitary lines, leaking storage tanks, radiologic/mixed waste disposal areas, oxidation ponds/lagoons, pesticide/herbicide mixing areas, solvent degreasing areas, surface impoundments, and vehicle maintenance areas and wood preserving sites.

"Sludge" is a material that contains at least 10% water by weight, and may comprise animal waste, dredged material, human waste, soil or sediment, wet byproduct from mining, or farming, such as tailing, feed lot waste, biomass production waste, or any combination of the foregoing.

"Soil Conditioner" means a substance (e.g., bentonite, cement, clay, pozzolate or silicate) that, when added to a sludge, can alter or stabilize the physio-chemical characteristics of the sludge.

"Stabilization" means the conversion of an active organic matter in sludge into inert material.

"Suspended Solids" means small particles of solid pollutants that float on the surface of, or are suspended in, liquid.

Remedial Water

Remedial water is an aqueous fluid that upon contact with a sludge causes a beneficial change in one or more properties of the sludge. The property may be a hydrodynamic property, allowing greater fluid movement, or may be a chemical property such as a decrease in the concentration of a molecular toxin, microorganism, or an undesirable form of a heavy metal. In this context, remedial water is not limited to solutions of water and salts, but also includes slurries, multiphasic solutions with other solvents, and even colloidal suspensions. In each case, the remedial "water" is injected into a sludge that has one or more known or suspected undesirable properties.

Various Remedial Waters are Useful for Removing or Converting Different Contaminants Generally speaking, sludge contaminants can be grouped into three categories. The contaminant categories are: (1) microorganism, such as bacterial, viral or other microbe; (2) chemical toxin, such as an organic hydrocarbon or other toxic molecule (e.g. a bacterial toxin protein) or inorganic toxic compound; and (3) heavy metals or nuclides such as lead, mercury, cadmium, or radioactive isotope. A given remedial water may be chosen or designed to best alter or remove a contaminant in one or more of these categories. The remedial water may be used by itself for one step remediation treatment, may be combined with other remedial water(s) in the same water treatment step, or used in a sequential step to provide a more specific remediation strategy.

For remediation of microorganism contamination, the water should contain a chemical such as a strong oxidant that reacts sufficiently with molecule(s) of the microorganism to kill it. Many oxidants are known for this purpose, as described in U.S. Pat. Nos. 4,468,297 and 5,705,050 the contents of which are specifically incorporated by reference in their entireties. Preferred among these are chlorine bleach (hypochlorite ion, hypochlorous acid and dichlorine), hydrogen peroxide and ozone. For the present invention, oxidants such as these and others, including other oxygen species, and activated species of a halide such chlorine and bromine are particularly useful because these molecules naturally decompose in water and do not present a large hazard after use.

For remediation of chemical toxin contamination, the remedial water should contain an active chemical that reacts with a toxic molecule to covalently alter its chemical structure. Methods now used in the field emphasize chemical conversion of such compounds by high temperature, or removal by steam extraction. In contrast to the expectations of the art, embodiments of the present invention rely on the generation at the site of use, of water that contains active solutes that can alter the covalent structure of chemical toxins without heat. In some embodiments, the water soluble active solutes are prepared on site.

In one embodiment remedial water contains hydrogen peroxide and injected into the sludge. Iron (Fe++) in the sludge converts hydrogen peroxide to hydroxyl radical by Fenton's reaction. The hydroxyl radical then destroys chemicals in the sludge.

Another embodiment uses dissolved ozone as the active solute. This reagent may be made on site by UV light or by an electrochemical cell, as described in U.S. Pat. No. 5,460,705.

In yet another embodiment, an alkaline solution of pH 9 or greater is used as remedial water. In preferred embodiments where, for example, the alkaline solution is used to convert heavy metal to a less toxic form, the pH may be above 10. Such alkaline solutions are well known and may be form by, for example, adding sodium hydroxide to water. In a preferred embodiment, as illustrated by Example 3, the alkaline water is alkaline ECA water. Alkaline ECA water remediates many kinds of sludge and dry materials. In a preferred example, electric arc furnace dust is remediated by treatment with alkaline ECA water, followed by water washing to remove solubilized species of lead and other metals.

A referred embodiment of ECA water for remediation uses reactive species of chlorine, bromine, oxygen and other substances prepared by electrochemical activation (ECA) of water, as for example, described in U.S. Pat. Nos. 5,792,336, 5,445,722, 5,439,577 and 5,531,865, the contents of which are specifically incorporated herein in their entireties. The inventor obtained data showing that ECA water can eliminate aromatic hydrocarbons by contacting ECA water with sludge and measuring the aromatic hydrocarbons before and after the treatment. ECA water is particularly preferred for removing this class of contaminants from sludge.

In a preferred embodiment, ECA water is generated during injection or is generated shortly (within one day, preferably within 240 minutes, more preferably within 60 minutes) before injection. When storing the ECA water for this embodiment, it is important to keep the water in a sealed container to prevent loss of reactive species in the water as described, for example, in U.S. Pat. No. 5,762,779, issued to Shiramizu, June 1995.

For remediation of heavy metal or nuclide contamination, the remedial water advantageously may have a high pH such as a pH between 9 to 12, and preferably between pH 9.5 and 11, or contain an additive such as phosphate or sulfide to convert the metal or nuclide atom to a less harmful form. A variety of chemicals and materials are known as described, for example by U.S. Pat. Nos. 5,266,494, 4,079,003, 5,877, 393 and 5,898,093, for converting a heavy metal or a nuclide to a more acceptable chemical form. Such chemicals can be added to the water as a slurry or as solutes in the water.

In preferred embodiments of the invention, a wet sludge is prepared from dust such as electric arc furnace dust that contains heavy metals such as lead and cadmium, and other elements such as selenium. An insoluble form of a toxic metal such as ammonium lead chloride, is converted into a less toxic form, and/or a more soluble form by adding ECA water. Preferably, ECA water is added at a volume ratio within the range of 0.1 to 10 volumes ECA water to sludge, and preferably within the range of 0.5 to 2 volumes of ECA water to sludge, followed by washing with water to remove solubilized forms of the metal(s).

In one embodiment the remedial water is regular tap water and may be used to leach a substance from the sludge, or to wash the sludge between successive remedial waters that are not compatible. In another embodiment the remedial water is tap water that contains a surfactant at a concentration below the critical micelle formation of the surfactant. Of course many remedial waters are known and can be devised to carry out a desired change in the sludge.

The inventor surprisingly found that ECA water works well to improve fluid flow of sludge, and that ECA water does this by ion exchange of particles (particularly clay and humic particles), which decreases the water holding capacity of the particles, causing them to come together. Clay particles in many sludges, particularly sediments, comprise pseudo two-dimensional crystal lattice structures that can be hydrated (stay apart by layers of surface bound water and electrolytes) in the presence of high sodium concentration. When cations such as magnesium or aluminum are present, such divalent or trivalent cations form ionic bonds with excess negative charges on the surfaces and decreasing the amount of surface bound water. This results in the plates staying together, excluding water from the multiply-negative flat surfaces. When a high concentration of sodium ion or hydrogen ion is added on the other hand, the positive ion competes with the cation "glue" causing removal of the basal cation and subsequent dispersal of the plate-like structures that make up a particle. A charge balancing act with exchangeable cations is responsible for reversibly causing the plates to come together. Another way of interpreting this process is that presence of the multiply valent cation decreases the layers of water that bind to the surface.

The inventor obtained data indicating that addition of either anodic or cathodic ECA water to sludge greatly improved its hydrodynamic properties, increasing the flow of remedial water through sludge. Without wishing to be bound by any one theory of the invention, it is believed that contact with active species in ECA affects the negatively charged flat surfaces of clay particles, altering the balance of charges on their surfaces. That is, normally cations outside the lattice structure of the clay plate satisfy the charge imbalance of excess negative charges in the clay place lattice. However, active species in ECA water react with and unbalance the charges on the plate surfaces, causing less water to adhere to their surfaces, and the plates come together. This property of ECA is greatly desired because it increases flow of remedial water through sludge.

Accordingly, a specific preferred embodiment of the invention is to treat sludge that contains clay by injection of anodic or cathodic ECA water. This injection optionally is followed by a dewatering step and then an injection of a second remedial water that can now react more readily with clay surfaces and substances that are released from clay surfaces. Acidic ECA is particularly desired in this context because acidic water has a high concentration of chlorine species and most importantly, a high ORP of typically more than 1000 mV (standard system). Accordingly, such ECA water can make the clay particles more negative, thus strengthening the attraction with multivalent cation and improving the adhesion of plates to each other.

The inventor obtained data that indicates organic molecules bound to surfaces such as humic and clay particles are released from the particles upon treatment with either anodic or cathodic ECA water. Without wishing to be bound by any one theory of the invention, it is hypothesized that the ECA water achieves this desirable result by having a lower dielectric constant compared to regular water. A lower dielectric constant means less hydrogen binding combinations in the water and a diminished hydrophobic effect such as seen with solvents such as methanol that have lower dielectric constants due to less hydrogen bonding. Normally, the hydrophobic effect forces molecules with one or more hydrophobic portions to adhere to solid surfaces (such as humic and clay particles) and to each other in the presence of water. In a preferred embodiment ECA water replaces regular water that contains such particles, allowing desorption.

Of course, this useful property of ECA water is not limited to remediation of sludge but is particularly useful for processing other materials that contain one or more organic molecules that may flocculate or bind to solid phase surfaces due to hydrophobic effect binding. In fact, this useful property of ECA water can be exploited together with the other advantage of active species such as carbonate radicals in the water. That is, ECA water can be used for novel material processing technology involving transformation of organic molecules with electroactive catalysts and other reactants generally. For example, large scale synthesis of a polymer or other product from reactants in a water suspension or solution can be improved by using ECA water, particularly for reactions that consume a free radical catalyst or electronegative species. In this case, a salt of the non-reactive form of the free radical such as carbonate or an electroactive species is added to water that undergoes ECA activation. The activated water then is used in the reaction. Electrochemical activation of water that contains such forms as, for example, carbonate, bicarbonate or tartrate is useful for reactions such as polymerization reactions, metal plating reactions and reactions that form minerals such as hydroxyapatite.

One example of an organic synthesis reaction in this context is provided in U.S. Pat. No. 5,077,350. This disclosure describes the preparation of a poly(aryl ether/thioether)- poly(aryl carbonate) block copolymer corresponding to the formula: $((A-O').\text{sub.}n'-AO'COO-B-O-COO)_m'-$, or $((A-O')_n'-AO'-B-O-COO)_m'-$ wherein n' is equal to the number of repeated activated arylether/thioether units in the copolymer block segment and m' is equal to the number of repeated poly(aryl carbonate) units in the copolymer block segment. ECA activated carbonate water can be used in this reaction to provide a radical. In this case, a carbonate or other stable radical produced by ECA activation transfers to an aromatic radical having at least one electron-withdrawing group located in a position ortho or para to an ether/thioether linking group.

Other such reactions can be carried out with ECA water prepared from water with added salt such as potassium or sodium carbonate. ECA water that contains a high concentration of carbonate radical such as for example above 1 mM, 5 mM, or above 50 mM also can be used to eliminate high temperatures now required for some reactions such as in the formation of hydroxyapetite crystals, which utilize high temperature processes to make a carbonate radical.

In a preferred embodiment for large scale batch processing, material processing of suspensions or of colloidal materials with ECA water further include injecting the ECA water via an array of injectors into a closed environment as described herein to achieve economies of scale. Although sludge treatment is emphasized within this disclosure, these other embodiments also are specifically contemplated. In sum, the processes and tools useful for remediation of sludge have particular value for industrial chemical conversion processes generally, particularly for large scale batch processes.

The inventor also surprisingly found that either acid or alkaline ECA water, when added to sludge that contains polyaromatic hydrocarbons ("PAH"), facilitates the release of PAH's and also chemically converts PAH's into other chemical forms. As shown in the Examples, data was obtained indicating that when sludge is treated with regular tap water, and PAH added to the sludge, the PAH are not readily released for assay. For example, naphthalene added to such samples could be recovered only to 27%. The recoveries of phenanthrene and chrysene added to sludge samples treated with water showed only 51% recovery. In contrast, sludge samples that had been treated with acid or alkaline ECA water displayed much higher recoveries of added PAH, indicating that the surfaces of sludge (clay) particles treated with ECA water release PAH much better than regular water treated sludge particles. This is an advantageous property of ECA used for sludge remediation and is particularly preferred.

In preferred embodiments remedial water will contain an oxidant or free radical that naturally decays in water solution and which does not present an environmental hazard downstream. Most preferred in this context is an oxidant that is prepared from water itself, such as hydrogen peroxide, hydroxyl radical, or other activated oxygen species. Also preferred is a salt that is added to the water before ECA treatment, wherein the salt forms an active species such as an active chlorine or bromine species, and then substantially (at least 90%, preferably more than 95%, more preferably more than 99%, and more preferably more than 99.9%) decomposes before discharge from sludge during a dewatering step.

Decomposition of an oxidant or radical according to this embodiment occurs primarily from reaction with a sludge contaminant and by natural reactions in water. An important attribute of this embodiment is that the chemical agent used for remediation does not noticeably harm the environment. Furthermore, the reactive species preferably is created from water itself on site. Thus, hazardous transport of caustic material to the site to make remedial water is not necessary. In preferred embodiments an environmentally acceptable salt such as a sodium salt of chloride, bromide, or carbonate is added to water, which then undergoes ECA treatment to generate the active chemical agent(s).

Generation of ECA Water

Machines and processes for generating ECA water are known as described by U.S. Pat. Nos. 5,871,623, 5,635,040, 5,628,888, 4,867,856, 4,676,882, 3,827,964, 3812,026, 5,419,824, 5,439,577 and 5,364,508, the contents of which are specifically incorporated by reference in their entireties. In many if not most of these disclosures, the type of activated species was not known or was miss-characterized, as mentioned by Weres et al. (see column 4, lines 19–26 of U.S. Pat. No. 5,364,508). In the present invention, all varieties of ECA generated water are useful in some capacities because all have at least some effect with at least some contaminants found in sludge. It was realized for example, that ECA water having activated chlorine species from added sodium chloride works better for correcting microbe contamination. The addition of a bromide salt such as sodium bromide is even more preferred because of the greater stability of some activated bromine species compared to the corresponding chlorine species.

Either anodic water or cathodic water can be used for killing microbes in sludge and ECA water prepared from dilute salt solution such as sodium bromide is particularly useful for this purpose. The various electrode compositions described in the cited publications are contemplated for sludge treatment generally. Furthermore, as mentioned above, the inventor obtained data indicating that either anodic and cathodic water from a commercially available ECA water generator having platinum electrodes could release and (apparently) even destroy organic chemical toxins from contaminated sludge. For removing and destroying organic toxins, it is preferred to generate ECA water using electrodes having a surface semiconductor composition that favors hydroxyl free radical formation, as described by Weres in U.S. Pat. No. 5,439,577.

Weres teaches degradation of toxic chemicals by direct reaction with hydroxyl radical either on or very close to an electrode surface. A central problem in this field, as summarized by Weres is that a toxin has to virtually contact an ECA electrode for destruction. The sludge toxins, however, are in the sludge and must be (1) released from clay particles and (2) covalently altered (or physically separated from) within such material. The inventor discovered three ways to overcome this problem. One, the inventor discovered that a secondary compound such as carbonate or bicarbonate can be used to transfer a strong radical such as the hydroxyl radical taught by Weres to a more stable (albeit somewhat weaker) form that exists for a long enough period to enter sludge and react with an organic molecule there. Two, the ECA water actually desorbs organic toxins from sludge (presumably) by interfering with the hydrophobic effect that holds them there, and by altering the charge balance at clay particle surfaces, which controls flocculation and adsorption characteristics of these particles.

The third means to overcome the problems associated with the extremely short half-life of hydroxyl radical is to generate this radical within the sludge. In this embodiment, hydrogen peroxide is injected into sludge that contains $Fe^{++}$, where the hydrogen peroxide decomposes to hydroxyl radical by the Fenton reaction. The hydroxyl radical in this case is created within the sludge itself, obviating the instability problem noted by Weres and allowing the radical to contact sludge after injection of remedial water. In one embodiment, Fe++ is added to sludge by injection of an iron solution, preferably in a reducing form such as alkaline ECA water to maintain the iron in a plus 2 state. After adding Fe++ to the sludge with one set of injectors, either a different set of injectors are used to add the hydrogen peroxide to the sludge, or a rinse solution is injected through the original set of injectors, in order to prevent premature Fenton's reaction within the injectors.

The inventor realized that sodium bromide actually may be more useful than chlorine for sludge remediation because activated bromine species could be produced at high concentrations more easily at certain voltage gradients, and also may be more stable than the respective chlorine species, allowing more time to create, store or use remedial water having the activated bromine. Without wishing to be bound by any one theory of this embodiment, the inventor believes that the larger bromine nucleus better stabilizes an unbalanced electron configuration compared to the chlorine nucleus, allowing a longer half-life for transfer by injection into sludge and reaction with toxins and surface molecules of microorganisms. In some cases where cost and iodine byproduct is not a problem, iodine salts such as sodium iodine or potassium also can be used in water that undergoes electrochemical treatment with electrode technology.

Although ECA studies emphasize the use of sodium chloride to generate active chlorine species, the inventor realized that bromine could replace chlorine to generate ECA water for disinfection (killing of microbes) or, in some cases chemical conversion (chemical modification of a toxic molecule to a less toxic chemical form) and thereby limit the production of harmful chlorinated hydrocarbons. That is, adding only bromine salt, or a bromine/chlorine mixture where bromine replaces some of the chlorine, provides activated halide species with less attendant risk of generating chlorinated hydrocarbons. Accordingly, this embodiment provides less chlorine and more bromine in ECA water to disinfect and chemically convert organics with less harmful chloronated byproducts compared to previous technology. This embodiment is particularly important for sludge materials that are to enter the environment but can be used also for other applications outside the present invention, where disinfection or chemical conversion is desired.

ECA water is preferred that comprises an active chlorine, bromine, iodine, carbonate, sulfur and/or other species formed by electrochemical activation of a salt solution. In one preferred embodiment, a solid salt or concentrated salt solution containing one or more of sodium chloride, sodium bromide, sodium carbonate and sodium bicarbonate is added to water in a range of between 1.0 mg/l to 2000 mg/l and preferably between 20 mg/l to 1000 mg/l (of the anion species) to form a salt water solution. The salt water solution then contacts an anode and/or cathode that forms a circuit between two or more electrodes. In one embodiment the salt solution contacts both anode(s) and cathode(s) equally, but in a preferred embodiment, the solution flowed is directed so that salt concentration is focused primarily (highest) in the region of the anode to obtain maximum effect of creating activated halide species. In yet another embodiment chlorine (without sodium) is added. In these embodiments, it is most preferred to remove activated halide enriched anodic ECA water immediately downstream of the anode. Such quick addition and removal provides active halide enriched ECA water without needing an expensive membrane in the ECA generator.

ECA Generation on Site is Preferred

One aim of the invention is to limit exposure of the environment to chemical agents used to remediate sludge. A preferred embodiment that meets this aim is to prepare active chemical species used for remediation at the site of use and allow the species to decay to an environmentally benign form before discharge into the environment. It was discovered that activated species of chlorine, bromine, carbonate and oxygen, could be generated in water with electric power at the site of use and that such species exist long enough to allow contacting the water with sludge to remediate the sludge. Furthermore, water generated from the remediation could be disposed in the environment after the ECA activated species itself decayed, and thus would not react further.

The inventor brought electrical energy to the location of a sludge sample, made ECA water, and contacted the ECA water with sludge. This procedure successfully removed several toxins in the sludge. After its use in this treatment the ECA water lost its strong ORP, indicating that the active species had naturally degraded and that the water could be safely discharged into the environment. Several such experiments are described in the Examples.

In a preferred embodiment ECA water is prepared and stored in a closed system such as a plastic tank for up to 20 minutes before use. In other embodiments, ECA water is stored up to 60 minutes, up to 4 hours and even up to 48 hours before bringing the water into contact with sludge to remediate a toxin. For example, in one embodiment a heavy metal ion or complex is converted into a different form that can be removed by leaching via treatment with a higher concentration of hydroxyl ion (i.e. high pH such as pH above 8, preferably above 9, and more preferably above 10). Such alkaline ECA water is generated at the cathode of an ECA water making device. This cathodic water may be stored for a few days before use if not exposed to air.

The inventor further learned that certain species of activated compounds could be made having chemical life times that exceed the lifetime of compounds previously described and appreciated by others. For example, although various activated chlorine species exist for a short period in water, the most active ones, particularly the free radical ones are not stable enough to allow transfer into sludge. That is, these species rapidly decay in water. The inventor learned that some activated bromine species, in contrast, have a longer decay time, allowing more time to store the remedial water before use. The decay time of some activated sulfur, and selenium species for example, also can be longer, allowing advantageous use of salts that contain these atoms in water that undergoes ECA treatment.

According to one embodiment, a salt containing one of these elements, or a salt of (particularly a potassium salt) of an acid such as, for example, $PO_4$, $AsO_4$, $VO_4$, $SO_4$, $SiO_4$ or tartrate or even more preferably a carbonate or bicarbonate, is used to make a free radical having a long enough half life (compared with that of a hydroxyl radical) to allow the radical to contact an organic toxin after injection of the remedial water. One embodiment thus contemplates adding a salt such as sodium bromide or potassium bromide, and especially a potassium or sodium bicarbonate or carbonate to water that undergoes ECA activation. Such activated remedial water will contain a higher amount of stable free radicals having useful properties for killing microbes or removing organic and inorganic toxins.

This latter embodiment is particularly preferred for removing aromatic compounds that have at least one electron donating aromatic group. Such organic compounds may comprise an aromatic group having a substituent selected from the group consisting of —OR and —NR$_1$ R$_2$ wherein R, R$_1$ and R$_2$ are H or a hydrocarbon radical and wherein R, R$_1$ and R$_2$ are the same or different. Examples of such compounds are phenols and anilines and, in particular, pentachlorophenol, as described in U.S. Pat. No. 5,104,550.

In practice, a salt as described above, may be added to the water or a concentrated solution of the salt may be added to the water. Preferably, a sodium or potassium carbonate or bicarbonate is added and even more preferably, such addition is used to maintain a pH at least 8 and, more preferably between pH 8 and 10. Of course combinations of salts, such as any of the above-mentioned salts may be used together. The exact amount of ions such as carbonate or bicarbonate ions that must be added will depend, in part, upon the amount of carbonate and bicarbonate that initially is in the water. The natural level depends on prior exposure to the atmosphere and may be for example, more than 10 mg/ml, 100 mg/l, or even more than 300 mg/l. Optionally, further amounts should be added to bring the level up to 100 mg/l, 250 mg/l, 500 mg/l, 1000 mg/l, or even higher than 1000 mg/l.

After addition of (for example) carbonate, the water is subjected to ECA, which directly may form carbonate radicals, and indirectly, via initial formation of another stronger radical such as the hydroxyl radical studied by Weres. The carbonate and bicarbonate ions in the water undergoing ECA react with hydroxyl (and other) radicals to form carbonate radical anions and bicarbonate radicals respectively, which have a longer life time and can be injected into sludge to react with oxidizable contaminants there. Some of these reactions are described below:

$$OH \cdot + CO_3^{2-} \text{ becomes } CO_3 \cdot + OH^-$$

$$CO_3 \cdot + X \text{ becomes } X^+ + CO_3^{2-}$$

$$OH \cdot + HCO_3^- \text{ becomes } HCO_3 \cdot + OH^-$$

$$HCO_3 \cdot + X \text{ becomes } X^+ + HCO_3^-$$

where x=oxidizable contaminant having an electron donating aromatic group.

Without wishing to be bound by any particular theory of the invention, it is theorized that the carbonate radical anion and bicarbonate ion combine with an oxidizable molecule in sludge to form a positively charged species, which is more susceptible to degradation, and carbonate and bicarbonate ions. Other molecules that are known to form more stable radicals compared to the hydroxyl radical, as exemplified above, also can be used in this embodiment. The carbonate radical is preferred in many instances however, because of its costs and low environmental toxicity. Although this procedure is preferred for sludges that contain aromatic compounds that have at least one electron donating aromatic group, as well as other organic compounds, the carbonate radicals also can be used for removing microbial contamination as well.

This latter embodiment of the invention overcomes the hydroxyl radical short life-time problem acknowledged in the Weres patents and allows radicals formed by ECA during injection to enter the sludge and react with organic compounds there. Weres pointed out that an organic molecule toxin virtually has to contact an ECA electrode in order to react with a hydroxyl radical formed at the electrode. This embodiment of the present invention, in contrast, provides stable radical formation during ECA activation. Without wishing to be bound by any one theory of the invention, it is believed that these radicals are more stabile by virtue of a larger atom nucleus, particularly from the chlorine, bromine, sulfur or selenium atom, or in the case of carbonate, greater delocalization. In one embodiment, such a radical is created within the injector pipe by ECA activation inside the pipe during injection into a sludge. The radical formed during injection has a long enough lifetime to chemically interact with a toxin in the sludge, altering the chemical structure of the toxin.

Sacrificial Electrodes for Lower Cost

Some embodiments of the invention employ ECA activation to make remediation water. In preferred embodiments the capital cost of making ECA water is lowered by using electrodes comprised of a low cost metal such as iron, copper, magnesium, titanium, and aluminum and by replacing the electrodes on a periodic use basis, that is replacement after at least a certain amount of the electrode surface such as for example, more than 10%, more than 30% or more than 50% is removed or altered. Copper is preferred for use with sludges that contain organic contaminants and particularly for microorganism contaminants. Copper electrodes form active species of copper that react with and kill microorganisms. In one embodiment where it is desired to add aluminum ions to clays, use of an aluminum sacrificial electrode is preferred because it releases aluminum into the remedial water. In one embodiment the injectors comprise aluminum for one or both electrodes and the body of the injector may be aluminum.

Remediation by Injection of Remedial Water

Sludge Handling

Sludge may be pumped as a slurry with or without added water into a container, or added via a hopper. A sludge that has high solids content may be delivered to an enclosed container via a hopper fitted with spray nozzles. In this case, remedial water may be added at this stage (before or during transfer of sludge to a container) in order to change the solids/liquid ratio. In a preferred embodiment the sludge is transferred to a conveyer belt inside a closed space to minimize air exchange with outside air. The conveyer belt moves the sludge while, at the same time, remedial water is added.

In a preferred embodiment of the closed conveyer belt design, a first type of remedial water is added to the sludge, making it thinner before or at the same time the sludge is added to one part of the conveyer belt, and the sludge is dewatered on the conveyor belt. After dewatering, a second remedial water is added to the sludge, optionally followed by a second dewatering step on the conveyer belt. Of course, during initial placement of sludge onto the belt, some air exchange with the environment may occur at an opening which receives the sludge. In one embodiment, a remedial water may be added at location away from an opening in order to limit undesirable out-gassing and an additional water may be added between an out-gassing water and an opening as a vapor suppressant. The opening and/or exit apertures of the enclosed conveyer belt preferably are covered with a shield to further limit this exchange.

The conveyer may dewater the sludge by virtue of openings within its surface that allow water passage but that hinder particle passage. The lateral sides of the conveyer belt preferably do not move and should consist of a water impermeable surface. In one embodiment however, the conveyor belt is water impermeable and the sides of the conveyer belt consist of geotextile material that preferentially passes water. Most preferably the sides are exposed to a vacuum to facilitate dewatering.

Optional Pre-Treatment

Each sludge to be treated has its own properties, which can be determined by many different methods known in this field. Preferably, these properties are considered before using the methods and tools of the invention to obtain the lowest cost remediation. Accordingly, many cases will involve a pre-treatment step. For example, a sludge may contain large solids that might interfere with optimum fluid movement during remedial treatment.

In some embodiments the solids may be removed for optimum geoengineering of the beneficial end product such as a landfill liner or impermeable barrier. In some embodiments large items such as railroad ties, cables, rocks, tires and rubble may exist and should be removed. Still further, particular engineering treatment parameters such as void ratio, porosity, liquid/gas transmissivity, bulking, the opening/screen size of injectors used, and volume reduction may be considered and the sludge processed accordingly. A consideration of engineering parameters may dictate particle size reduction or classification by, for example, one or more of the following techniques: grizzly (vibrating screen adjusted for typically minus 1", 3", 6"), hydrocyclone (adjusted typically for 20–250 microns), or gravity separation carried out by air or water separation.

Among the parameters for consideration are hydrodynamic factors, including: physical parameters such as hydraulic conductivity vs. void ratio, slurry density, grain size, bulking factor; chemical parameters such as solubility, absorption constants, KD, KOC, inorganic speciation, pH, ORP; transport parameters such as effective porosity vs. void ratio; and transmissivity such as apparent opening size diffusion, drainage path and length time. These parameters are known to the skilled artisan, who will appreciate various alternative treatments in combination with the materials and methods of the invention as described here.

When considering a given parameter, it is best to perform small scale laboratory testing of the sludge to be tested with varying types of remedial water and to determine the parameter empirically. This is particularly preferred for determining the ratio of remedial water volume to treated sludge volume as needed for the particular sludge. In this context, the selection of injector type and size may be optimized further by a consideration of such a factor. Most preferably, a small bench scale test is made to determine the flow rate for a given injector both before and after adding remedial water.

Injectors

Where desired, injection of remedial water occurs by spraying or flowing into sludge that is processed by an enclosed conveyer belt as described above. In these cases, the injectors are spray nozzles, which add remedial water from above the conveyer belt, or simple openings, which flow remedial water into the sludge before or during transfer of sludge to the conveyer. Many contemplated embodiments allow processing in situ or in a large box, particularly where the box is adapted for transport to an end-use site, such as an ISO container or rail road car. Because of the economical significance of processing sludge in a transportable container, the present disclosure emphasizes methods (including injectors) and materials for ex situ use.

Plastic pipes such as PVC pipes with equidistantly spaced outlets are useful to inject remedial water into a container or in situ. Most preferred are conventional water well injection pipes, dewatering well point and other pipes having the desired dimensions and flow rates. The following companies make a variety of water well screens and dewatering well screens that are particularly useful and provide catalogs and other information to the public that describe details of injectors suitable for the invention. Houston Well Screens, Houston Tex., Johnson Well Screens, St. Paul Minn.; Pram Technologies, Minneapolis, Minn.; Nagaoka, U.S.A., Houston, Tex.; Alloy Machine Works, Smyrna, Ga.; Titan Industries, Paxton, Nebr.; Schumacher Filters, Asheville, N.C.; Bedrock Enterprises, Forked River; Demco, West Midlands, England; Maass Midwest, Huntley, Ill.; and Hendricks Screen, Owensburo, Ky.

As will be appreciated by a review of the available information from these companies, filtermesh screens are very useful, particularly for sandy sludge and typically are fitted to any type of perforated base pipe, although plastic, with between $\frac{1}{16}$ to $\frac{1}{14}$ inch slot width, and preferably $\frac{1}{8}$ inch slot width with over 20% open area is common. Another very useful type available from Titan Industries is the Enviroflex Well Screen which has an innermost layer of co-extruded HDPE geonet that provides interior support for a geotextile. The geonet and geotextile are bonded together in a continuous tube which prevents silt or sand infiltration and supports the geotextile layer from collapse. This kind of injector can be used for injecting into a confined space without the necessity of using a second geotextile around the space and is preferred for low-labor applications.

Continuous slot all welded screens, made from virtually any weldable material such as carbon steel and PVC are readily available. Most such screens are made with a wrapping wire having a triangular profile to form a slot opening which open inwardly. For most such screen the finest reliable opening size for fine sediment sludges is in the range of 0.004 to 0.01 inches. Some of these commercially available injectors are useful to both inject and remove remedial water from sludge. In a preferred embodiment, one set of vertical injectors injects remedial water and another set of vertical injectors removes remedial water. In this case it is preferred that each injector of each set is parallel and be equidistantly positioned from other injectors of the same set.

Multiple injectors, that preferably are parallel and equidistantly spaced from each other are particularly useful in a two dimensional array. When injecting into a box, the injectors should be vertical although they can be placed at some other angle. When injecting into sludge in situ, the injectors may be at any angle but preferably are perpendicular to the surface of the sludge, which typically is a sediment under a body of water.

In preferred embodiments, the flow rate and the dimensions of injectors used are determined after obtaining representative data for flow characteristics of sludge in a bench scale test. That is, an optimal leach ratio or other engineering treatment parameter may be determined in advance of selecting a flow rate/injector size combination. Such bench scale tests generally are known as, for example, described by U.S. Pat. No. 5,266,494. A representative bench-scale test used by the inventor is shown in the Examples.

In most cases, the flow rate will be adjusted based on knowledge or expectation of how a sludge should behave with a given injector type although different injector types can be used. For example, if bench-scale test results indicate that treated sludge allows poor flow rate at a given step of treatment, the operator can increase the pressure of remedial water that is injected, increase the size of the injector, increase the number of injectors for a given space, increase the mesh/size/position of exit/orifice openings, or even apply a vacuum to horizontal drain pipes at the bottom (or vertical drain pipes at the edges or sides) of the box. In this context, multiple sumps also may be used at the bottom for drainage and a vacuum may be applied to them. Of course, a combination of sumps and/or drain pipes can be switched and a vacuum can be applied and adjusted to further control the flow.

Preferably, the inner diameter of the injector pipes is between 0.5 to 8 inches, preferably between 1 to 4 inches, and more preferably between 1.5 to 2 inches. The length of the injector that is placed within the sludge should be between 50 to 100 percent, preferably between 70 and 100 percent of the sludge depth, and more preferably between 75 and 95 percent of the sludge depth. When using horizontal drain pipes at the bottom, the preferred distance between the lowest orifice of an injector and the bottom of the sludge is within 50 to 150% of the distance between that orifice and the adjacent orifices from adjacent injector pipes. By way of example, if injector pipes are equally spaced 2 feet apart in a grid, with a bottom orifice at the lowest point on each injector, the injectors should be inserted to between 1 and 3 feet from the bottom of the container.

The injector pipes administer remedial water to the sludge. The remedial water may be prepared and stored in an enclosed container that is attached or becomes attached to the injectors during use. In some embodiments, a particular remedial water used may be prepared within the injectors, or within a subset of injectors that are specially designed for this purpose. For preferred embodiments that employ ECA water, the injectors dedicated for generating remedial water may comprise one or metals or semiconductors that are electrically connected to an electric power source and controlling circuitry to make active species that alter one or more undesireable components of the sludge. In one embodiment, the dedicated injectors primarily condition the water to remove one or more undesireable elements such as iron, lead, arsenic, or other inorganic component. The inventor in fact has precipitated complexes that comprise calcium, magnesium and zinc by electrochemical activation of water.

Figure 1:
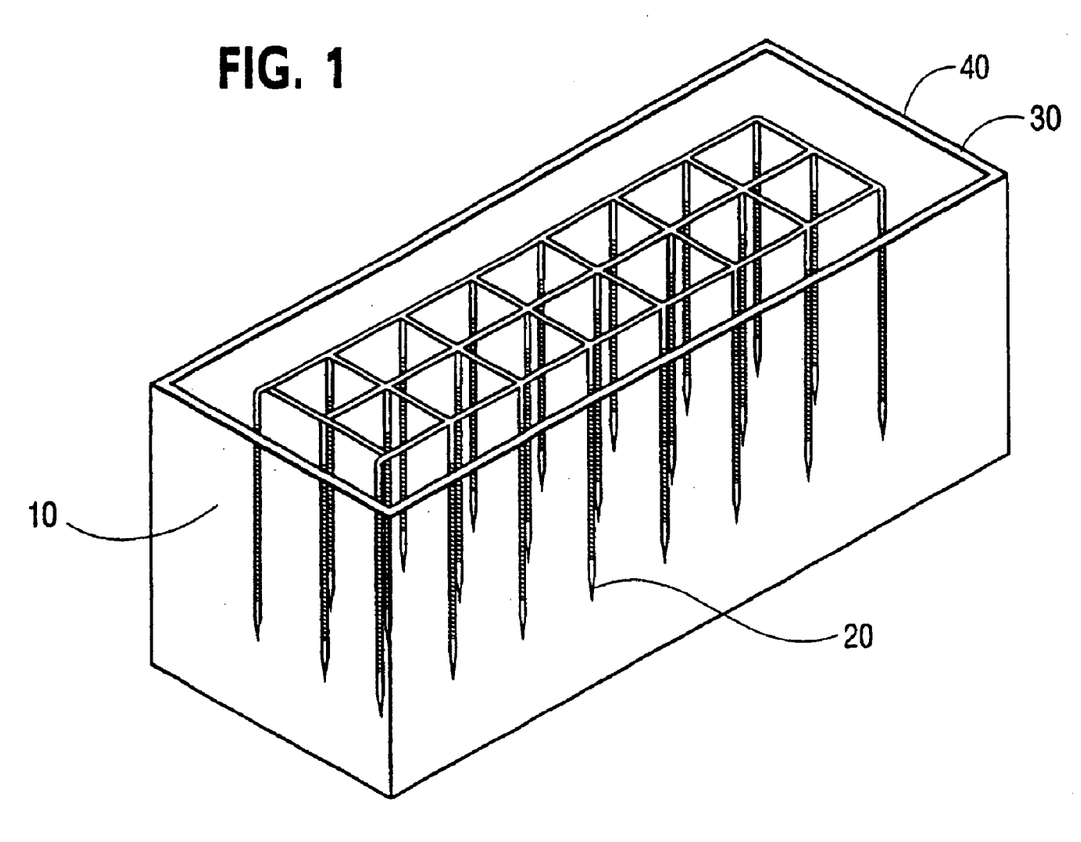
FIG. 1 describes an embodiment of the invention that injects remedial water into sludge that has been placed into an ISO container.
Figure 2:
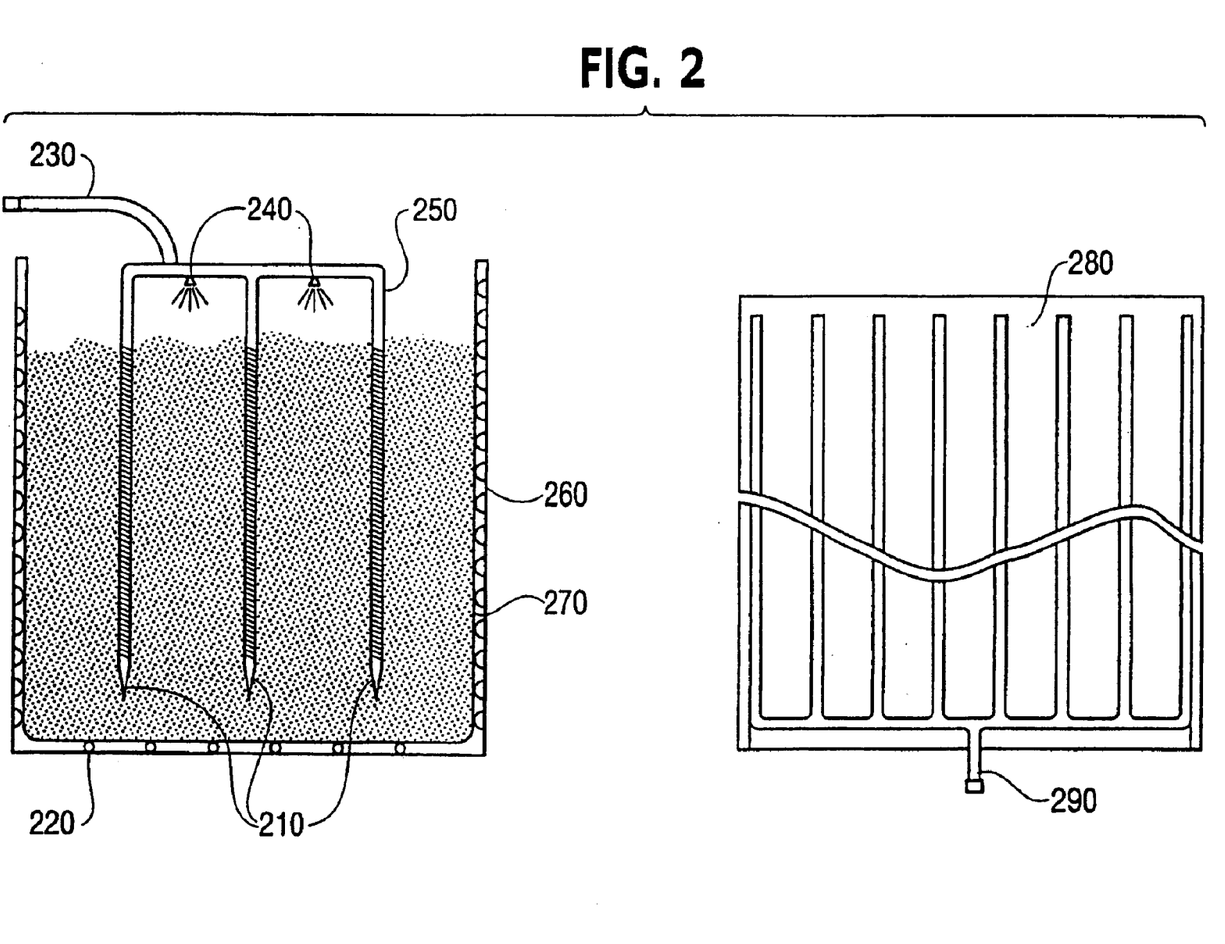
FIG. 2 shows further details of ISO container that has been modified according to the embodiment shown in FIG. 1.

In a preferred embodiment that uses a closed ISO container lined with a geotextile (8' wide by 7' deep by 40' long and a volume of 40 cubic yards), sludge is placed into the ISO container followed by insertion of 48 standard "injector type" 2" diameter PVC pipes 5' in length, having 100 slot size at 2' center spacing. FIGS. 1 and 2 exemplify this embodiment. FIG. 1 is a perspective view of an ISO container with array 10 of twenty four 1.5" inner diameter stainless steel pipe injectors placed inside. Each injector has a diffuser 20. Forty weight geotextile liner 30 is spaced 2 inches from wall 40.

The left side of FIG. 2 is a side view of the device from FIG. 1, showing injector pipes 210 placed into sludge, the sludge being represented by the shaded portion. Ends of the drain pipes 220 are seen as six circles a the bottom in this representation. Water inlet 230 is at the top left and optional spray nozzles 240 are located 2 feet off center at the top of manifold 250. Rubber mounds, placed every 6 inches, are seen as round protrusions on wall 260 and hold geotextile liner 270 off wall 260.

The right hand side of FIG. 2 is a top view with the elongated center of the ISO container missing to emphasize drain pipe end regions 280 and common drain outlet 290 on opposite ends. The perforated pipes 280 here are shown as a grid of 8 parallel pipes with one outlet 290. During use, the top is covered with a plastic sheet, part of the geotextile, or other barrier (not shown in these figures).

Large scaled-up versions of the invention are particularly useful for processing large amounts of sludge. As mentioned above, even an enclosed conveyer belt may be used for both dewatering and injection of remedial water. Of course, larger sized box-like containers, from 150 feet in area to 10,000 feet area and between 1 foot deep and 50 feet deep. A preferred range is an enclosure that is between 200 to 1000 feet in area and between 2 and 20 feet deep. The enclosure need not be rectangular but preferably the array of injector pipes are designed to inject remedial water throughout the entire volume. By way of example, an enclosure can be constructed with dimensions of 40 feet wide by 10 feet deep and 100 feet long. In this case, 64 3" diameter PCV pipes 8 feet long may be inserted into sludge that is piled 9 feet deep within the container.

Preferably, a pump is used upstream of the source of remedial water rather than between the remedial water source and the injector pipes. That is, a water source is attached to the inlet of the pump and the pump outlet is attached to the injector. This allows the generation of active species in the remedial water that otherwise would react with the interior of the pump. Inert non-reactive surfaces are preferred for the injector pipes for the same reason. The inert plastic surface limits decomposition of active solutes in the remedial water during injection.

Injection of Sludge In Situ

In this embodiment, sediment sludge is treated in situ. Areas of sludge in situ that may be treated by an array of pipes may be for example, as small as 100 feet square and as large as 100,000 feet square. Preferably the area is between 1000 and 10,000 feet square. The depth of the area that is to be treated preferably is within 1 to 50 feet from the surface of the sludge, and preferably between 2 and 20 feet deep. By way of example, a sediment volume may be treated having a width, length and depth of 20 feet, 100 feet and 5 feet, respectively, and is under 10 feet of water. The sediment is treated by vertically inserting an array of 2 by 20 polyvinyl chloride pipes (each with 2 inch diameter) having perforated lower portions, and unperforated upper portions, into the sediment so that the lower portion of the pipe extends through the top 4.5 feet of the sediment. The lower perforated portion of the pipes is 4 four feet long such that pipe openings only exist within the sediment after placement. The pipes are fluidically connected to a source of remedial water and to a pump, which preferably is upstream of the remedial water source.

According to this example, the injector pipes are inserted into the sediment to the desired depth. Then the remedial water generator and the pump are turned on. The pump pushes fresh water through the remedial water generator and into the injector pipes. Remedial water exits the pipes at their openings to enter the sediment. After flowing water at a rate of approximately 1 gallon per minute per individual pipe for 10 minutes, the generator and the pump are turned off. Contaminants within the sludge are sampled after the treatment and are altered to less toxic form(s) by this treatment.

In a preferred embodiment, a sediment is treated by remedial water, the injector pipes are removed, and then the treated sediment is removed by a suction dredge. In this case, injection of remedial water provides two advantages. One, the injection loosens up the sediment and selects a sediment volume to be removed, and two, the remedial water removes toxic substances that otherwise would be further stirred up and cause contamination to the water, or to the environment after removal.

In another embodiment, in situ sediment is treated by insertion of injector pipes horizontally between 0 to 90 degrees with respect to the horizontal into the sediment. Remedial water then is administered. The precise angle between zero to 90 degrees from the horizontal readily will be determined by the operator depending on the sediment depth, compactness and the availability of equipment. In a related embodiment, remedial water is pulsed into the sediment, and in yet another embodiment, at least two types of remedial water are added at different times to the sediment. One preferred embodiment is to inject activating remedial water that chemically reacts with molecules and further, has antiseptic activity against microbes, followed by water having a pH above 8, preferably above 9, and more preferably above 10, and which alters the chemical state of a heavy metal to decrease its chemical reactivity and make it less toxic.

Injection of Sludge Ex-Situ in an Enclosed Container

Sludge preferably may be treated within a container particularly when the sludge will be transported to an end-use location and the container matches an available transport system. Examples of such containers are a railcar, hopper car, roll-off container, truck, barge compartment, and ISO container. In each of these cases, the container is modified to allow dewatering and remedial water injectors are inserted into sludge that has been placed into the container. In one embodiment however, the container is not movable and may be for example, a geotextile lined earthen cell or cave within the earth.

The container has placed within it an impervious geotextile liner in order to contain all liquids and to enclose horizontal (and/or vertical) drain pipes and vertical injector pipes/ The liner provides an enclosed environment which, reduces air/liquid release to the environment, limits exposure of treated material to ambient air and light, and which optionally provides an air tight environment for a vacuum to assist dewatering. One purpose of the liner is to prevent contact of liquid with the walls of the container. The outer surface of the geotextile liner is water impermeable for this reason.

The composition of a suitable geotextile liner for dewatering is generally known and, for example may consist of a polyethylene liner on the outside surface with a geotextile inner liner that has only limited permeability to solids. U.S. Pat. Nos. 5,505,557 and 4,120,605, which are herein incorporated by their entireties by reference, describe materials that are suitable as geotextile liners.

In a preferred embodiment, drain pipes are placed between the geotextile inner liner and the outer water impermeable liner to allow dewatering. Preferably the drain pipes are a horizontal array, for example, as shown in FIG. 2. Optionally, the space that includes the drain pipes is exposed to a vacuum from the pipes to assist dewatering. In practice, the geomembrane liner normally first is placed in the bottom of the container to aid the removal of liquid, with either gravity or vacuum assistance. Then the horizontal dewatering pipes are added. A woven or non-woven geotextile, or combination of the above, is placed inside and on top of the horizontal drain pipes for the purpose of containing the solids and to act as a filter medium to minimize solids release through the fabric. A "non-woven material" in this context, may consist of, for example, a plastic/nylon mesh or felt like fabric.

In another embodiment a geotextile sock (optionally replacing the geotextile fabric) is used over the drain pipes (or sumps, which may be used in place of or to supplement the drain pipes). The sumps or drain pipes, or course may have been placed vertically, particularly in comers of the confined space, or horizontally. This embodiment whereby a geotextile sock is placed over the drains is useful for containing the solids to act as a filter medium to minimize solid release through the fabric.

After excess water (pore water) removal through the geotextile liner, remedial water is added via an array of injectors and then pumping (or flowing under gravity) the remedial water through the injectors. During injection of remedial water or after a delay time, water may be removed by the drains (and or sumps), and if necessary, the injectors may be used for the addition of air or to aid in the removal of water. The remedial water may be applied in stages (either at different times or in a different combination of injectors), combining one or more of an oxidizing solution, reducing solution, mineralization (fixation) solution, or some combination of one or more of these solutions. Remedial water may be pulsed into the sediment and a wash step (typically insertion of only water) may be used between the addition of two different remedial waters that otherwise might react with each other directly. In one embodiment antiseptic remedial water is injected that chemically reacts with molecules, followed by injection of water having a high pH, wherein the high pH water alters the chemical state of a heavy metal to allow removal by leaching.

Post Treatment

After treatment, a sludge may be amended with an admixture such as a bentonite clay, pozzolan, lime or zeolite, depending on the desired material and geotechnical properties. Of course, further processing including the creation of aggregate materials through heat, for example by a high-temperature rotary kiln may be carried out. The preferred processes, however, do not use heat, limit airborne release, relies on lower temperature chemical oxidation and extraction methods, are less energy intensive and lower cost compared to the previous techniques and materials. Further, in many embodiments, the sludge is transported to an end-use location by shipment in the confined space that the sludge is treated in. In the embodiment wherein sludge is treated in situ, the treated sludge should be tested to verify the efficacy of the treatment, and then can be left in its natural environment, or further processed after removal. In the embodiment wherein sludge is treated with remedial water on a conveyer belt, the treated material can be dumped into a transport container, such as a dump truck, ISO container, dredge hold, barge, or rail road car. In embodiments of ex situ remediation, the sludge preferably is dewatered during processing, to minimize shipping costs.

Each document cited herein is specifically incorporated in its entirety by reference. The following examples are presented by way of illustration and not by way of limitation.

EXAMPLE 1

This example demonstrates that anodic and cathodic ECA water successfully remediated sludge samples by reducing the levels of poly aromatic hydrocarbons ("PAH") from sludge.

In the example, 250 gram samples of sludge were obtained from PAH contaminated toxic sediments from a large harbor. Anodic and cathodic ECA waters were obtained with "Super oxide labo" series 2 model sold by Tomoe USA company and manufactured by Altech Ltd. in Fujisawa, Japan in accordance with the instruction manual supplied with this instrument. The unit was adjusted for a 15 minute processing time. Each 250 gm sample was mixed in a 500 ml beaker with 250 ml of either water for approximately 10 seconds. The samples were transferred to a stainless steel 500 ml centrifuge tube and spun at 6500 rpm in a Sorvall RC2 for 30 minutes. For a control, a third sample was treated with tapwater that supplied the ECA unit. After centrifugation, each sample was decanted and the wet sample sent to an outside laboratory for independent analysis. The amount of certain PAH species that were recover able were determined by a standard method EPA 8270 modified.

|  | Acid ECA Water Treated ng/g dry wt | Tap Water Treated ng/g dry wt | Alkaline ECA Water Treated ng/g dry wt |
|---|---|---|---|
| Naphthalene | 7.85 | 8.67 | 8.07 |
| Acenaphthylene | 4.33 | 7.4 | 4.07 |
| Fluorene | 4.05 | 4.28 | 4.28 |
| Phenanthrene | 18.79 | 44.74 | 28.62 |
| Anthracene | 10.80 | 25.41 | 12.31 |
| Fluoranthene | 42.45 | 146.93 | 64.77 |
| Pyrene | 93.16 | 185.72 | 91.46 |
| Benzo[a]anthracene | 46.75 | 128.26 | 58.59 |
| Chrysene | 35.53 | 93.74 | 42.96 |
| Benzo[k]fluoranthene | 39.25 | 90.27 | 44.38 |
| Benzo[b]fluoranthene | 47.15 | 117.75 | 49.79 |
| Benzo[a]pyrene | 55.70 | 127.72 | 66.25 |
| Indeno[1,2,3-o,d]pyrene | 39.98 | 72.85 | 31.36 |
| Dibenz[a,h]anthracene | 7.22 | 16.23 | 6.50 |
| Benzo[g,h,I]perylene | 70.04 | 78.82 | 34.40 |

These data show that the treatment with ECA water significantly eliminated PAH in sludge, in comparison with treatment with regular water. Both anodic and cathodic water successfully eliminated a broad range of PAH molecules.

Portions of the treated samples were further examined by a recovery study. Surrogate reference PAH compounds d8-naphthalene, d10-phenanthrane and d12-chrysene were mixed into the wet samples immediately before analysis. The percent of each surrogate PAH recovered from each sample is shown in the table below.

|  | Anodic water treated | Control | Cathodic water treated |
|---|---|---|---|
| d8-naphthalene | 54% | 27% | 64% |
| d10-phenanthrane | 89% | 51% | 85% |
| d12-chrysene | 90% | 51% | 85% |

These data show that remedial treatment of the sludge by either ECA remedial water caused a much greater recovery of PAH's, in comparison to the control treatment with regular water.

EXAMPLE 2

This example demonstrates the use of high pH remedial water for removal of mercury from various sludges. ECA water was produced with an ARV Co. Limited, Model AL-2.0L unit Manufatured by ARV Co. Limited, (2811 Uchimichi Minami, Shinshiro-Shi Aichi, Japan). Approximately 500 g of mercury contaminated wet soil/sludge was washed over a 16 mesh teflon sieve with 5 liters of alkaline ECA water having a pH of 11.4. A gray precipitate and elemental mercury that formed were gravimetrically removed as residuals. After gravimetric removal of mercury, the remaining sample was washed with ECA water over a 100 mesh sieve (150 micron). Any visual mercury was again removed gravimetrically. The remaining sludge (i.e. minus 150 micron material) was placed into a 55 gallon drum having a geomembrane with a non-woven geotextile facing the inside to contain sediment. The drum was filled up to a 3 foot level. A No. 10 slotted PVC well point 2 inch in diameter and 3 feet in length (manufactured by Brainard Kilman/Long Year Co. Atlanta, Ga.) was vertically inserted in the middle of the sediment. Water having a pH of 11.5 (and containing $O_2^-$) was injected through the injector at a flow rate of 2 liters/min. After 100 minutes the injector was removed and the sludge was dewatered (water was removed) via two 1 inch diameter slotted drain pipes in the bottom of the container Four different sludges, as noted below, were treated. Total mercury in each treated sludge was determined by EPA Method 7470. The data shown in the table below indicate that injection of the remedial water into each sludge significantly removed mercury from the sludges.

| SLUDGE TYPE | Material Size (% wgt) | Hg Before | Hg After |
|---|---|---|---|
| Low concentration sandy soil | +16 size (45%) | 311 ppm | 8.7 ppm |
|  | +16–60 size (45%) | 311 ppm | 28 ppm |
| Medium concentration sandy soil | +100 size (88%) | 1100 ppm | 550 ppm |
|  | +100 size (5%) | 1100 ppm | 880 ppm |
| High concentration rich fines | +100 size (12%) | 320,000 ppm | 46,000 ppm |
|  | +100 size (77%) | 320,000 ppm | 35,000 ppm |
| Low concentration lagoon sludge | +100 size (26%) | 440 ppm | 150 ppm |

EXAMPLE 3

In this example, electric arc furnace dust "EAF dust" was treated with ECA water to remove metal toxins. Alkaline ECA and acid ECA water was produced as described in the above examples. Alkaline ECA water was added to EAF dust at 80% wgt/wgt and then solids were rinsed thrice with tap water and decanted. Acidic ECA water was then added to the solid fraction at 80% by volume, rinsed thrice with tap water and decanted. No adjustment was made for pH. Samples were collected from the aqueous phase of each ECA water treatment, filtered, and analyzed for total lead, cadmium, and selenium. Solid phase samples also were collected and analyzed by TCLP metals analysis (Toxicity Characteristic Leaching Procedure EPA SW-846, Method 1311) and x-ray diffraction for qualitative speciation of lead, cadmium and selenium. Untreated EAF dust also was analyzed.

The TCLP analysis results of EAF dust before and after treatment are shown below.

|  | EAF Dust Before Treatment | EAF Dust After Treatment |
|---|---|---|
| Lead | 1200 mg/l | 93 mg/l |
| Camium | 530 mg/l | 0.66 mg/l |
| Selenium | 3.4 mg/l | ND (<0.05 mg/l) |

The x-ray diffraction analysis indicated that the untreated EAF dust contained ammonium lead chloride but that the material treated by 80% alkaline ECA water contained potassium lead sulfate ($KclPbSO_4/K_2PbSO_4$), lead chloride hydroxide ($PbClOH$), and lead sulfate ($PbSO_4/PbSO_4$—$PbO$). Furthermore, the alkaline treatment decant solution contained 1000 mg/l cadmium and 4.7 mg/l selenium. The following acid ECA water treatment did not appreciably leach more lead and the aqueous phase from this treatment contained 38 mg/l cadmium and 0.52 mg/l selenium. Further, the acid ECA water, instead of further solubilizing lead compounds, which are known to be soluble in acid, was found to have reconverted the lead into leachable forms of potassium lead sulfate, lead chloride hydroxide and lead sulfate.

Of course, changes and modifications to the embodiments presented herein are readily understood by the skilled artisan after reading this specification and furthermore, such changes and modifications may be practiced within the scope of the appended claims.

What is claimed is:

1. A method of treating dredged material, comprising the steps:
   (a) placing the dredged material into an ISO container, rail car or other box having a liner and at least one drain for dewatering;
   (b) closing the container by covering the top of the material with a plastic barrier;
   (c) dewatering the material;
   (d) vertically inserting injector pipes into the dewatered material;
   (e) injecting remedial water into the material via the injector pipes;
   (f) closing the container by covering the top of the material with a plastic barrier; and
   (g) dewatering the material.

2. The method of claim 1, wherein the container is an ISO container, has a depth of between 3 feet and 20 feet, the liner comprises a non-woven geotextile bag that is held from the sides of the container by protuberances on the side walls and the injector pipes extend the dredged material in the container.

3. The method of claim 1, wherein the liner is a geomembrane or geosynthetic material covering the inside of the box.

4. The method of claim 3, wherein the box is selected from the group consisting of a railcar, hopper car, roll-off container, truck, barge compartment, ISO container, a geotextile lined earthen cell and cave within the earth.

5. The method of claim 1, wherein the injector pipes have 100 slot size.

6. The method of claim 1, wherein the liner is held off a box wall by round protrusions.

7. The method of claim 1, wherein the pipes are perforated.

8. The method of claim 1, wherein step a is carried out via an enclosed conveyer belt that provides dewatering.

9. The method of claim 8, wherein the enclosed conveyor belt further adds remedial water.

10. The method of claim 1, wherein the pipes are stainless steel pipes or PVC pipes.

11. The method of claim 1, wherein the box has an area of between 150 square feet and 10,000 square feet and has a depth of between 1 foot and 50 feet.

12. The method of claim 1, wherein the box is rectangular.

13. The method of claim 1, wherein the remedial water of step e is pushed by a pump located upstream of the remedial water.

14. The method of claim 1, wherein the liner has a water impermeable outer surface.

15. The method of claim 1, wherein at least one geotextile sock is placed over a drain to minimize release of solids.

16. The method of claim 1, further comprising the injection of high pH water to alter the chemical state of a heavy metal.

17. The method of claim 1, further comprising the step of transferring the treated material into a transport container.

18. The method of claim 17, wherein the transport container is a dump truck, ISO container, dredge hold, barge, or rail road car.

19. The method of claim 1, wherein the remedial water comprises at least 250 mg/l of an ion selected from the group consisting of carbonate ion and bicarbonate ion, and wherein at least some of the ion is a free radical.

20. The method of claim 1, wherein the remedial water comprises ozone, hydrogen peroxide, active chlorine, active bromine, or a radical formed directly or indirectly from hydroxyl radical.

21. The method of claim 1, wherein iron and an oxidant are added to the dredged material.

22. The method of claim 21, wherein the oxidant is hydrogen peroxide.

23. The method of claim 21, wherein the remedial water comprises ECA water.

24. The method of claim 1, wherein the injectors are metallic and produce ECA water by electrical energy.

25. The method of claim 24, wherein at least some injectors are aluminum or copper.

26. The method of claim 1, wherein at least some of the injectors are water well injection pipes or dewatering well points.

27. The method of claim 1, wherein the injectors comprise filtermesh screens fitted to perforated base pipes.

28. The method of claim 1, wherein the injectors comprise plastic pipes having slots between $1/16$ to $1/14$ inch widths.

29. The method of claim 1, wherein the injectors comprise openings with screening wherein the screening comprises an innermost layer of co-extruded HDPE geonet that provides interior support for a geotextile and the geonet and geotextile are bonded together in a continuous tube.

30. The method of claim 1, wherein the injectors comprise continuous slot all welded screens with wrapping wire having a triangular profile that forms inwardly opening slots.

31. The method of claim 1, wherein one set of injectors are used to inject water and another set are used to remove water.

32. The method of claim 1, wherein the same injectors inject remedial water and remove water during dewatering.

33. A method of remediating sludge that contains heavy metal, comprising placing the sludge into an ISO container, rail car or other box having a liner and at least one drain for dewatering;
   (b) closing the container by covering the top of the sludge with a plastic barrier;
   (c) dewatering the sludge;
   (d) vertically inserting injector pipes into the dewatered sludge;
   (e) injecting remedial water into the sludge via the injector pipes;
   (f) closing the container by covering the top of the sludge with a plastic barrier; and
   (g) dewatering the sludge.

* * * * *